US012584736B2

(12) United States Patent
Kikuchi

(10) Patent No.: US 12,584,736 B2
(45) Date of Patent: Mar. 24, 2026

(54) SURVEYING INSTRUMENT

(71) Applicant: TOPCON CORPORATION, Tokyo (JP)

(72) Inventor: Masaho Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 350 days.

(21) Appl. No.: 18/125,601

(22) Filed: Mar. 23, 2023

(65) Prior Publication Data

US 2023/0314131 A1 Oct. 5, 2023

(30) Foreign Application Priority Data

Mar. 30, 2022 (JP) ................................. 2022-057726

(51) Int. Cl.
*G01C 5/00* (2006.01)
*G01C 15/00* (2006.01)
*G01C 15/06* (2006.01)

(52) U.S. Cl.
CPC ............. *G01C 5/00* (2013.01); *G01C 15/006* (2013.01); *G01C 15/06* (2013.01); *G01C 15/008* (2013.01)

(58) Field of Classification Search
CPC .......... G01C 5/00; G01C 15/00; G01C 15/06; G01C 15/006; G01C 15/008;
(Continued)

(56) References Cited

U.S. PATENT DOCUMENTS 5,291,262 A 3/1994 Dunne
10,520,307 B2 * 12/2019 Ohtomo .................. G01S 17/86
(Continued)

FOREIGN PATENT DOCUMENTS

CN 101153796 A * 4/2008 ............. G06T 7/521
CN 205067877 U 3/2016
(Continued)

OTHER PUBLICATIONS

José L. García-Balboa et al. "A Field Procedure for the Assessment of the Centring Uncertainty of Geodetic and Surveying Instruments" sensors, 2018, pp. 1-16, 18, 3187, doi:10.3390/s18103187.
(Continued)

*Primary Examiner* — John E Breene
*Assistant Examiner* — Daniel M Quinn
(74) *Attorney, Agent, or Firm* — Studebaker Brackett PLLC

(57) ABSTRACT

In a surveying instrument including an instrument height measuring unit configured to make a distance measurement by emitting distance-measuring light to a distance-measuring object below a vertical axis of a surveying instrument main body, and an arithmetic unit configured to calculate a distance to the distance-measuring object by analyzing light being the distance-measuring light that has returned by being reflected by the distance-measuring object, and calculate an instrument height, the instrument height measuring unit is configured to make a distance measurement by irradiating the distance-measuring light toward a predetermined region of the distance-measuring object centered on a point below the vertical axis of the surveying instrument main body, and the arithmetic unit is configured to calculate the instrument height by operating an average value of distance-measurement values in the region. By calculating an average value of results of distance measurements of a predetermined region, the measurement accuracy can be improved.

10 Claims, 6 Drawing Sheets

(58) Field of Classification Search
CPC ... G01C 15/105; G01S 7/4813; G01S 7/4816;
G01S 17/08; G01S 17/10; G01S 17/42;
G01S 17/86; G01S 17/88; G01B 11/0608
USPC ......... 33/121, 227, 282, 283, 284, 300, 403,
33/574, 700; 356/247, 255
See application file for complete search history.

(56) References Cited

U.S. PATENT DOCUMENTS

| | | | | |
|---|---|---|---|---|
| 10,823,558 | B2 * | 11/2020 | Ohtomo | G01C 1/02 |
| 10,949,579 | B2 * | 3/2021 | Wodrich | G01C 21/206 |
| 2008/0231830 | A1 | 9/2008 | Osada | |
| 2016/0076885 | A1 * | 3/2016 | Nishita | G01C 5/00 |
| | | | | 29/428 |
| 2018/0003493 | A1 | 1/2018 | Bernhard et al. | |
| 2018/0224277 | A1 * | 8/2018 | Latova | G01C 15/008 |
| 2018/0356522 | A1 * | 12/2018 | Kikuchi | G01S 7/4911 |
| 2019/0011563 | A1 * | 1/2019 | Hall | G01S 17/42 |
| 2019/0120943 | A1 * | 4/2019 | Iguchi | G01S 17/08 |
| 2020/0166340 | A1 * | 5/2020 | Hinderling | F16M 11/046 |
| 2020/0386546 | A1 * | 12/2020 | Ohtomo | G01C 15/004 |
| 2021/0333408 | A1 * | 10/2021 | Herter | G01S 19/14 |
| 2023/0314135 | A1 | 10/2023 | Kikuchi et al. | |
| 2023/0349695 | A1 | 11/2023 | Kikuchi et al. | |

FOREIGN PATENT DOCUMENTS

| | | | |
|---|---|---|---|
| EP | 2 105 705 | A1 | 9/2009 |
| JP | H05-064720 | A | 3/1993 |
| JP | H06-213664 | A | 8/1994 |
| JP | 2008-232881 | A | 10/2008 |
| JP | 2019219319 | A * | 12/2019 |
| WO | 2008/124713 | A2 | 10/2008 |

OTHER PUBLICATIONS

Evangelia Lambrou et al. "Detecting the Centring Error of Geodetic Instruments Over a Ground Mark Through a Tribrach-Based Optical Plummet" Applied Geomatics, Nov. 15, 2017, pp. 237-245, vol. 9, https://doi.org/10.1007/s12518-017-0197-8.

* cited by examiner

SURVEYING INSTRUMENT

TECHNICAL FIELD

The present invention relates to a surveying instrument capable of measuring an instrument height.

BACKGROUND ART

In a survey work, first, a surveying instrument main body is disposed horizontally at a position vertically above a reference point through a leveling work and a centering work, and then, an instrument height that is a height from an optical center of the surveying instrument main body to the reference point vertically below the optical center is obtained. As a method for obtaining an instrument height, there is a method in which a worker manually measures an instrument height with a measuring tape or scale (Patent Literature 1).

CITATION LIST

Patent Literature

Patent Literature 1: Japanese Published Unexamined Utility Model Application No. H05-64720

SUMMARY OF INVENTION

Technical Problem

However, since a measurement with a measuring tape is manual work, there is a problem in that the measuring work is troublesome and low in accuracy. The centering work and the leveling work also cause a large error in the instrument height error unless these works are performed with high accuracy. Further, in a case where there are irregularities at a distance-measuring point even when a laser distance-measuring device is used, the accuracy deteriorates.

The present invention was made in view of this, and an object thereof is to provide a surveying instrument capable of easily acquiring a precise instrument height.

Solution to Problem

In order to solve the problem described above, in a surveying instrument according to an aspect of the present disclosure, in a surveying instrument including an instrument height measuring unit configured to make a distance measurement by emitting distance-measuring light to a distance-measuring object below a vertical axis of a surveying instrument main body, and an arithmetic unit configured to calculate a distance to the distance-measuring object by analyzing light being the distance-measuring light returned by being reflected by the distance-measuring object, and calculate an instrument height, the instrument height measuring unit is configured to make a distance measurement by irradiating the distance-measuring light toward a predetermined region of the distance-measuring object centered on a point below the vertical axis of the surveying instrument main body, and the arithmetic unit is configured to calculate the instrument height by operating an average value of distance-measurement values in the region.

According to this aspect, even when a distance-measuring point has irregularities or a tilt, by calculating an instrument height with respect to a surface combining the distance-measuring point and a peripheral region of the distance-measuring point, a distance-measurement value in which the irregularities or tilt is corrected can be acquired. Further, measurement is made a plurality of times in the region, so that the measurement accuracy can be improved by taking an average value, and a precise instrument height can be easily acquired.

Further, in an aspect, the instrument height measuring unit includes a light transmitting unit configured to emit the distance-measuring light toward the distance-measuring object, a light receiving unit configured to receive the distance-measuring light that has been emitted from the light transmitting unit and returned by being reflected by the distance-measuring object, and a defocusing lens disposed in a light path of the distance-measuring light and configured to diffuse incident light, the distance-measuring light that has passed through the defocusing lens is emitted toward a position below the vertical axis of the surveying instrument main body to irradiate the region of the distance-measuring object centered on the point below the vertical axis of the surveying instrument main body, and the arithmetic unit is configured to calculate the instrument height by taking an average distance to the region irradiated with the distance-measuring light as a distance to the distance-measuring object by calculating a distance to the distance-measuring object based on a light reception signal of the light receiving unit and further calculating an average value of the distance to the distance-measuring object. By using a defocusing lens, the distance-measuring light is expanded to a predetermined range, so that the distance-measuring point becomes an arbitrary point in the expanded irradiation region. By making successive measurements, the inside of the predetermined range is randomly measured many times. Without the need for changing the distance-measuring point in the predetermined region, different distance-measuring points can be naturally measured through the successive measurements.

Further, in an aspect, the defocusing lens is a plain lens. According to this aspect, by using a plain lens, the irradiation region can be easily slightly expanded. Further, an expansion range of the irradiation region can be set by a thickness.

Further, in an aspect, the distance-measuring light is visible laser light, and the distance-measuring light is irradiated as a spotlight for centering toward a position below the vertical axis of the surveying instrument main body. According to this aspect, distance-measuring light irradiated toward a position below the vertical axis of the surveying instrument main body doubles as a spotlight for a centering work, so that the centering work can be easily performed.

Further, in an aspect, the visible laser light is green laser light. By using high-visibility green laser light, a worker can easily align the spotlight with a reference point, so that the workability of the centering work is improved.

Further, in an aspect, the instrument height measuring unit is a distance-measuring device employing a pulse method. By using a pulse method, the irradiation region is prevented from being limited in size.

Further, in an aspect, the arithmetic unit operates an average value of measurement values in the region irradiated with the distance-measuring light, and further makes a correction with a tilt measured by an incorporated tilt sensor. Accordingly, a tilt around a horizontal axis of the surveying instrument main body is corrected.

Further, in an aspect, an irradiation region of the distance-measuring light at a distance of 1 m from a bottom surface of the surveying instrument main body has a maximum outer diameter of 5 mm to 30 mm. Accordingly, a distance-measurement can be made in a preferred range without protruding from a measuring mark.

Further, in an aspect, the instrument height measuring unit is a distance image sensor configured to acquire distance image information of a predetermined range, the distance-measuring light is infrared light, the distance image sensor includes a plurality of imaging elements for acquiring the distance image information, and the arithmetic unit is configured to calculate a distance for each of the imaging elements from signals received by the imaging elements, calculate an average value of the distances of the imaging elements in the predetermined range, and take the average value as a distance to the distance-measuring object. The centering work and the distance-measuring work can be performed by using the distance image sensor.

Advantageous Effects of Invention

As is clear from the description above, a surveying instrument capable of easily acquiring a precise instrument height can be provided.

DESCRIPTION OF EMBODIMENTS

Hereinafter, detailed embodiments of the present invention will be described with reference to the drawings. The embodiments do not limit the present invention but are illustrations, and all features described in the embodiments and combinations of the features are not necessarily essential for the present invention. In the following description of embodiments and modifications, the same configurations are provided with the same reference signs, and overlapping description will be omitted as appropriate.
(Surveying Instrument 1)

Figure 1:
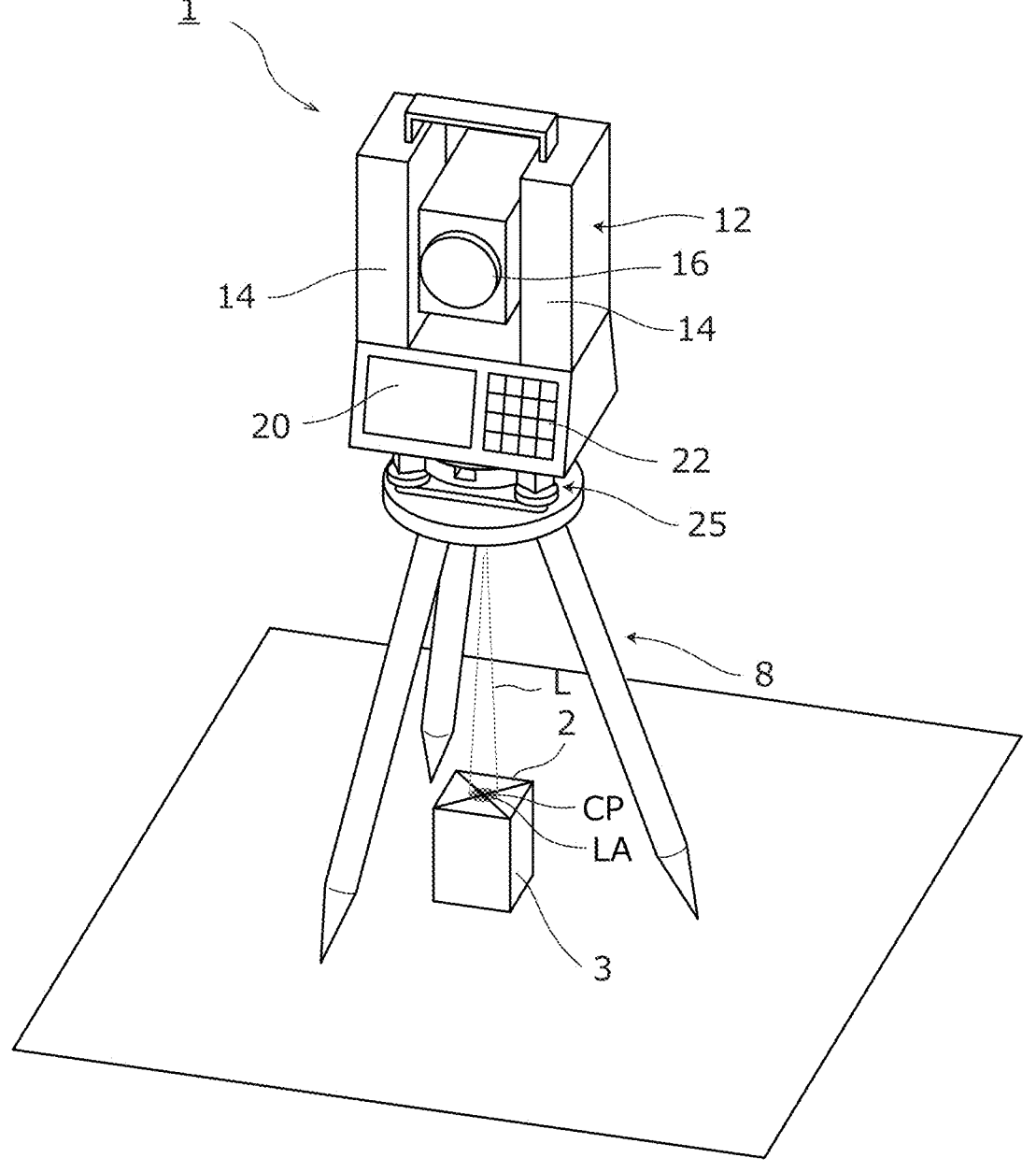
FIG. 1 is a perspective view of a surveying instrument and a measuring mark according to a preferred embodiment of the present invention.
Figure 2:
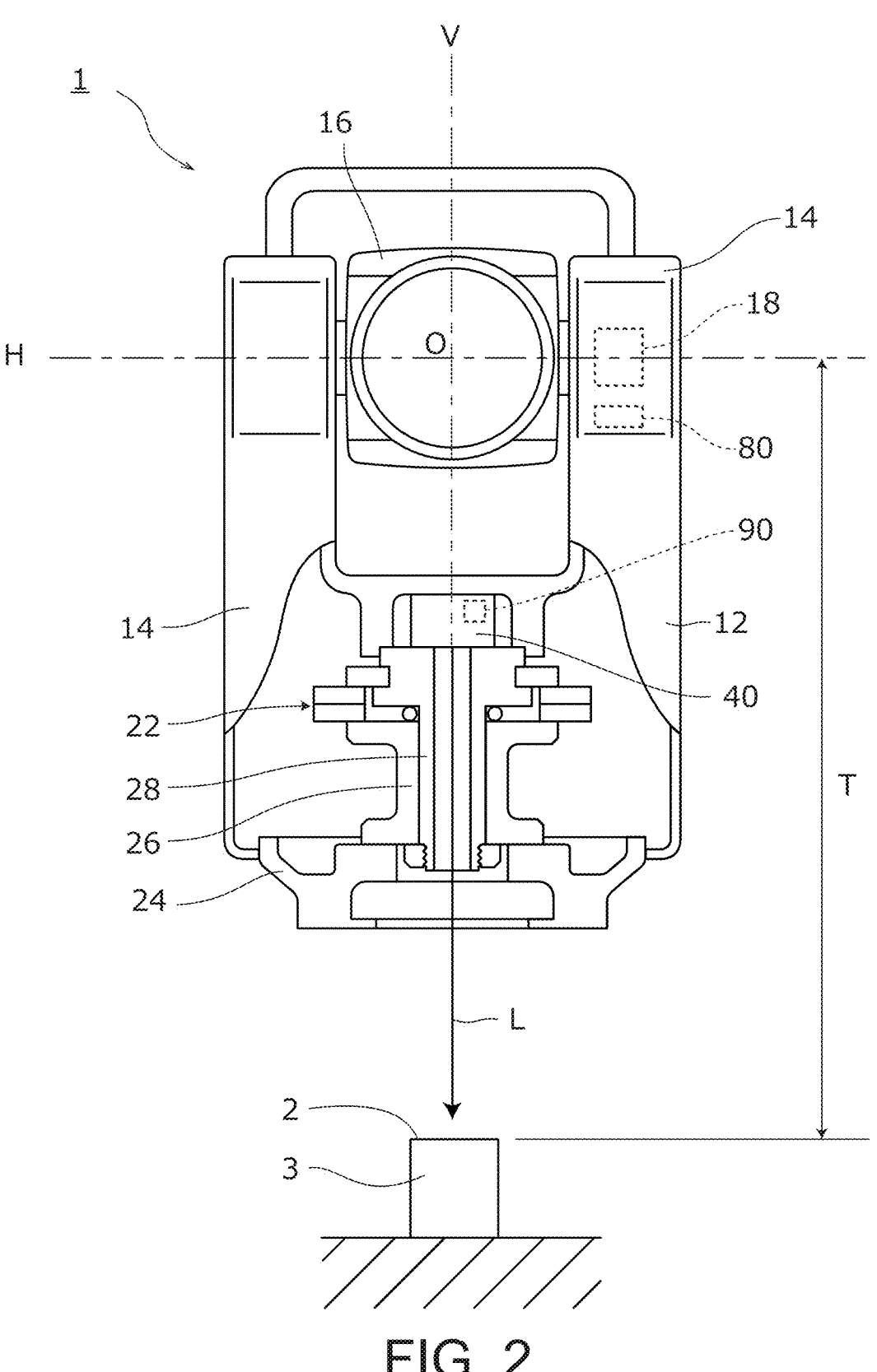
FIG. 2 is an explanatory view illustrating a schematic configuration of the surveying instrument and the measuring mark, and is a partially cut-away view.

FIG. 1 is a perspective view of a surveying instrument 1 and a measuring mark 2 according to a first embodiment. FIG. 2 is an explanatory view illustrating a schematic configuration of the surveying instrument 1 and the measuring mark 2. FIG. 2 is a partially cut-away view.

The surveying instrument 1 is a total station having distance-measuring and angle-measuring functions. The measuring mark 2 is a survey reference point, and is provided on the point of a stone marker 3.

The surveying instrument 1 includes a main body casing 12 as a housing of the surveying instrument. The main body casing 12 corresponds to the surveying instrument main body in Claims of the present application. The main body casing 12 includes two supporting posts 14, and between the two supporting posts 14, a collimating telescope 16 is axially supported turnably around a horizontal axis H.

On a lower portion of the main body casing 12, a display 20 and an operation key group 21 are disposed. The display 20 displays necessary information on a screen. The operation key group 21 is input means for inputting necessary setting conditions and commands.

Further, the main body casing 12 is disposed on a leveling base 25, and the leveling base 25 is fixed to a tripod 8 in a state where the leveling base 25 is placed on the tripod 8.

On a fixation portion 24 at a lower portion of the main body casing 12, a shaft cylinder 26 is disposed. Inside the shaft cylinder 26, a vertical shaft 28 provided vertically in the main body casing 12 is inserted, and axially supported turnably on the fixation portion 24 via a ball bearing. Accordingly, the main body casing 12 is turnable around the vertical shaft 28 with respect to the fixation portion 24. The leveling base 25 has an adjust screw for finely adjusting a tilt, and the fixation portion 24 is fixed onto the adjust screw. By turning of the adjust screw, the surveying instrument 1 is adjusted to be horizontal.

At an upper end portion of the shaft cylinder 26 and an upper end portion of the vertical shaft 28, flange portions facing each other are formed, and here, a rotary encoder 22 is provided. The rotary encoder 22 is a horizontal angle sensor, and detects a rotation amount of the main body casing 12.

The surveying instrument 1 is further equipped with a tilt sensor 80 that detects a tilt. For the tilt sensor 80, a conventional configuration may be used.

The vertical shaft 28 is formed into a hollow cylindrical shape, and an extension of a centerline V of the vertical shaft 28 intersects the horizontal axis H orthogonally. The orthogonal intersection point between the horizontal axis H and the centerline V is set as a center point O of the surveying instrument 1. Since the main body casing 12 axially supporting the collimating telescope 16 turns around the centerline V, by an angle sensor 18 provided on the horizontal axis H and the rotary encoder 22 described above, a rotation amount of the collimating telescope 16 around the horizontal axis H and a rotation amount around the centerline V are detected. That is, the centerline V is a vertical axis of the surveying instrument main body.

Above the vertical shaft 28, an instrument height measuring unit 40 for calculating an instrument height T of the surveying instrument 1 is disposed. The instrument height measuring unit 40 is a non-prism electro-optical distance measuring device which emits distance-measuring light L to a distance-measuring object, and analyzes reflected and returned light to measure a distance to the distance-measuring object. An optical axis of the instrument height measuring unit 40 is configured to match the centerline V, and the distance-measuring light L emitted from the instrument height measuring unit 40 passes through a hollow portion of the vertical shaft 28 and is emitted downward from a bottom surface of the surveying instrument 1.
(Instrument Height Measuring Unit 40)

Figure 3:
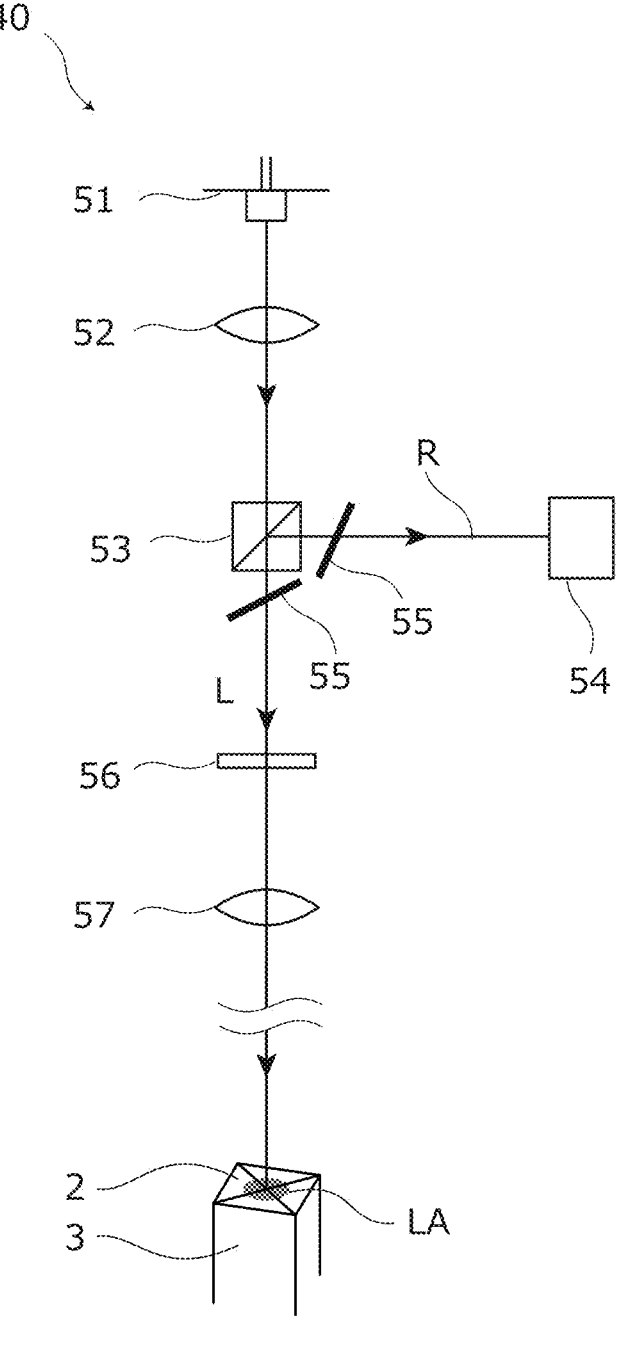
FIG. 3 illustrates an optical configuration of an instrument height measuring unit.

FIG. 3 is a configuration diagram of an optical system of the instrument height measuring unit 40.

The instrument height measuring unit 40 includes a light transmitting unit 51, a collimating lens 52, a beam splitter 53, a light receiving unit 54, a shutter 55, a defocusing lens 56, and an objective lens 57.

The light transmitting unit 51 is a light source that emits distance-measuring light L, and consists of a laser diode (LD).

The collimating lens 52 is an optical member that collimates incident light into parallel light and emits the parallel light. The collimating lens 52 is disposed in front of the light transmitting unit 51, and the distance-measuring light L emitted from the light transmitting unit 51 is collimated into parallel light by the collimating lens 52. An optical axis of the collimating lens 52 is configured to match the centerline V so that the optical axis line passes through the center point O of the surveying instrument 1. The beam splitter 53, the defocusing lens 56, and the objective lens 57 are disposed in this order on the optical axis of the collimating lens 52.

The beam splitter 53 is a half mirror, and reflects a portion of incident light and causes the remaining portion of incident light to pass through. The distance-measuring light L that has been emitted from the collimating lens 52 is made incident on the beam splitter 53, and a portion of the distance-measuring light L is reflected to become reference light R, and guided to a reference light path leading to the light receiving unit 54. The remaining distance-measuring light L that has not been reflected but passed through the beam splitter 53 is transmitted to a distance-measuring light path. The reference light R travels toward the light receiving unit 54, and is received by the light receiving unit 54.

The shutter 55 performs alternative switching between the distance-measuring light path and the reference light path by moving a switching plate.

The defocusing lens 56 is an optical member that diffuses and emits incident light. In the present embodiment, the defocusing lens 56 is a plain lens. The distance-measuring light L that has been condensed and emitted as laser light from the light transmitting unit 51, and collimated into parallel light by the collimating lens 52 is slightly diffused to be expanded in irradiation radius by the defocusing lens 56, and emitted.

The distance-measuring light L that has been emitted from the defocusing lens 56 travels toward the objective lens 57 and passes through the same, and is emitted toward a position below the surveying instrument main body. Then, the distance-measuring light L is reflected by a distance-measuring object (in the present embodiment, a measuring mark 2) of the surveying instrument 1 and returns to the surveying instrument 1 following the same course, and is then reflected by the beam splitter 53 and travels toward the light receiving unit 54, and is received by the light receiving unit 54.

The light receiving unit 54 consists of an Avalanche photodiode (APD). A light reception signal generated by the light receiving unit 54 is output to an arithmetic unit 90 (refer to FIG. 2).

The arithmetic unit 90 is a microcomputer including a memory and a CPU. An analysis program is stored in the memory. The arithmetic unit 90 analyzes light reception signals generated according to the distance-measuring light L and the reference light R received by the light receiving unit 54, and calculates a distance to the measuring mark 2. For analysis, a conventionally known method such as a phase difference method or a spot method is used, and any type of method can be used. A distance to the measuring mark 2 is calculated by the instrument height measuring unit 40. To this distance, a distance from the center point O to the instrument height measuring unit 40 is added, and accordingly, an instrument height T is calculated.

(Operation and Effect)

Figure 4:
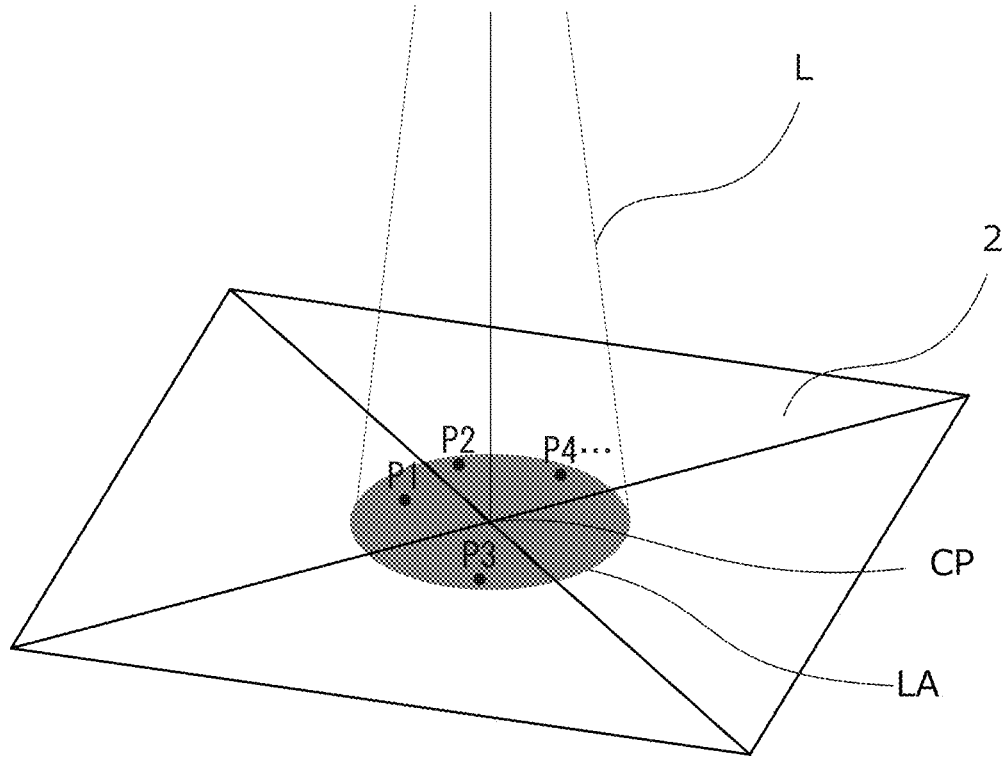
FIG. 4 is an enlarged view of a periphery of the measuring mark 2 in FIG. 1.

A distance measurement using the distance-measuring light L will be described in detail with reference to FIG. 4. FIG. 4 is an enlarged view of a periphery of the measuring mark 2 in FIG. 1. In the present embodiment, the distance-measuring light L is slightly expanded in irradiation radius by the defocusing lens 56. Therefore, when the distance-measuring light L is irradiated toward the distance-measuring object, the distance-measuring light L is visually recognized as light of an irradiation region LA. The distance-measuring light L is reflected by any point on the irradiation region LA, and received by the light receiving unit 54. An arbitrary point in the irradiation region LA is set as a distance-measuring point P, and a distance to the distance-measuring point P is calculated as a distance-measurement result in a manner such that, for example, a first distance-measurement result is obtained at a distance-measuring point P1, a next distance-measurement result is obtained at a distance-measuring point P2, and a distance-measurement result after the next is obtained at a distance-measuring point P3. The distance-measuring point P for a distance to which is measured is arbitrarily selected around a reference point CP in the irradiation region LA, the reference point CP being set as a point on an optical axis of the irradiation region, that is, a point vertically below the vertical axis of the surveying instrument main body in the irradiation region LA. By averaging distance-measurement results according to light reception signals by reflection at these random distance-measuring points P, the arithmetic unit 90 obtains an average of a distance to the irradiation region LA. The arithmetic unit 90 calculates the distance to the irradiation region LA as a distance to the measuring mark 2, and to this calculation result, by adding a height from the center point O to the instrument height measuring unit 40, the arithmetic unit 90 obtains an instrument height T. The calculated instrument height T is displayed on the display 20. The instrument height measuring unit 40 can measure a distance to a random point in the irradiation region LA just by successively performing distance measurements, and at each time of measurement, the distance-measuring point is changed in the irradiation region LA. The instrument height measuring unit 40 successively performs distance measurements by the distance-measuring light L. By operating an average value of a plurality of distance-measurement results successively obtained, the arithmetic unit 90 calculates an average distance to the irradiation region LA as a distance to the measuring mark 2.

The averaging of distance-measurement results by the arithmetic unit 90 may be provided as an average value of values measured in a predetermined measurement time, or may be provided as a result calculated by always acquiring an average value of measurement values and continuing the calculation until an amplitude of the average values converges to be within a predetermined range.

By calculating an average value of the distance to the irradiation region LA instead of an irradiation point irradiated with laser light, slight irregularities or tilt at the irradiation point is corrected, and a distance to the measuring mark 2 can be precisely measured. Further, a slight tilt of the surveying instrument 1 from horizontality which cannot be completely manually corrected is also corrected. Therefore, an instrument height T can be easily measured with precision.

Figures 5A, 5B:
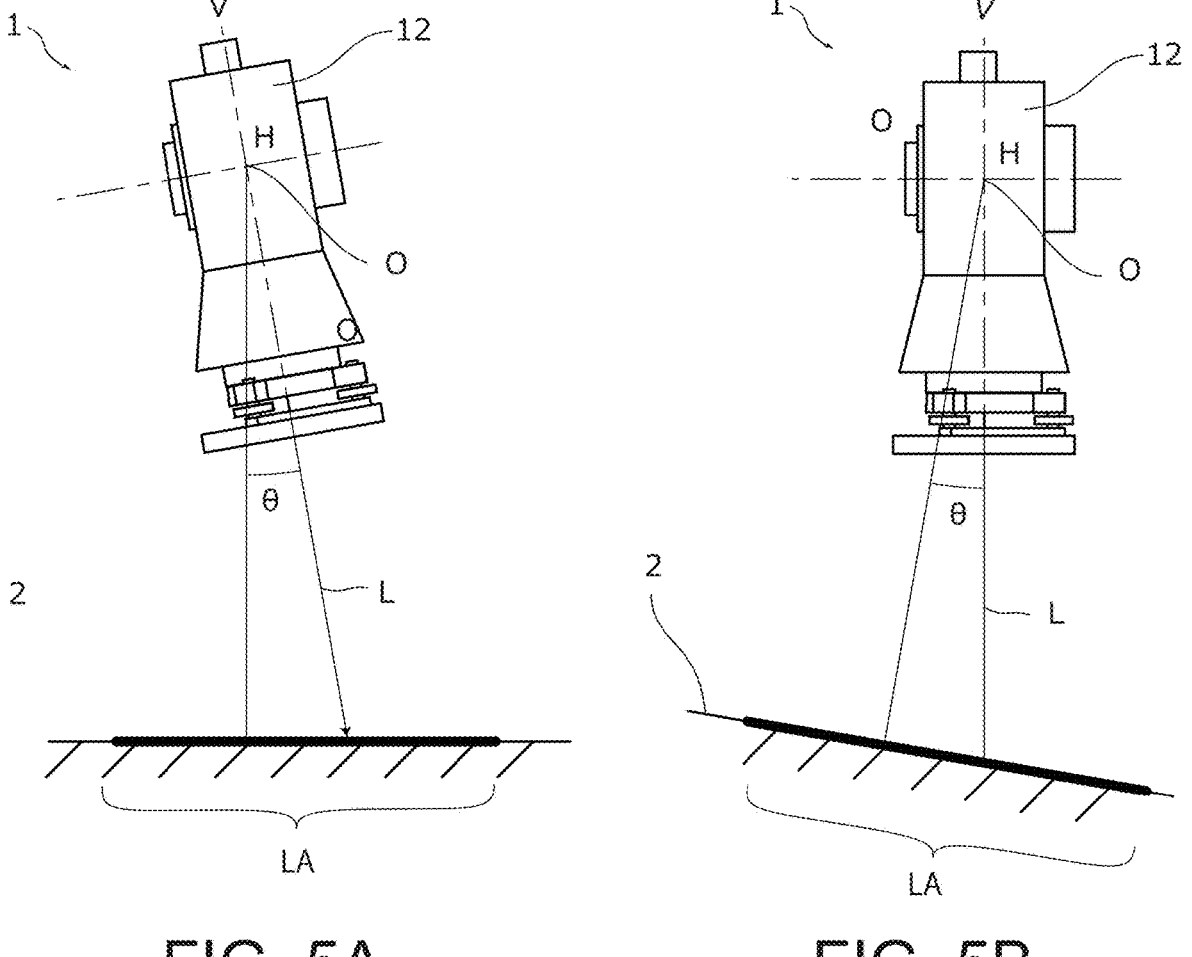
FIGS. 5A and 5B are views describing an operation and effect of the surveying instrument.

After distances to the irradiation region LA are averaged, by making a correction with a tilt measured by the tilt sensor 80 incorporated in the surveying instrument 1, in particular, a tilt around the horizontal axis H, an instrument height T can be calculated with higher precision, and this is preferable. This will be described with reference to FIGS. 5A and 5B. FIGS. 5A and 5B illustrate a tilted state of the surveying instrument 1 or the measuring mark 2. FIG. 5A illustrates a state where the surveying instrument 1 has a tilt with respect to the horizontal axis H. FIG. 5B illustrates a state where the measuring mark 2 has a tilt with respect to the horizontal axis H.

The surveying instrument 1 is provided with a level bubble tube parallel to the horizontal axis H. In a leveling work, a tilt of the surveying instrument 1 is adjusted so that the bubble in the level bubble tube is positioned at a center. Since the tilt is adjusted based on the horizontal axis H, the surveying instrument 1 may result in a state of slightly tilting around the horizontal axis H (refer to FIG. 5A). Further, the measuring mark 2 may have a tilt or irregularities (refer to FIG. 5B). That is, there is a case where the surveying instrument 1 or the measuring mark 2 may not be relatively horizontal with respect to the horizontal axis H, and in this case, an error occurs in the instrument height T. This error can be canceled by calculating a distance to the irradiation region LA. When the surveying instrument 1 has a tilt (FIG. 5A), an angle $\theta$ of the tilt is measured with the incorporated tilt sensor 80, so that by correcting the calculated instrument height T with the angle $\theta$, a more accurate instrument height T can be obtained. When the measuring mark 2 has a tilt or irregularities (FIG. 5B), an error in the instrument height T by the tilt or irregularities is corrected by averaging distance-measurement values measured in the irradiation region LA.

The irradiation region LA preferably has an appropriate size not to protrude from the measuring mark 2. Therefore, a maximum outer diameter of the irradiation region LA onto a virtual plane positioned at a distance of 1 m from the bottom surface of the surveying instrument 1 is preferably 2 mm to 30 mm, and more preferably 5 mm to 20 mm. The defocusing lens 56 is not limited to a plain lens, and a lens with a calculated lens curve may be used, or a plurality of lenses may be used. The distance-measuring light L increased in irradiation radius and further made as parallel light may be emitted. The size of the irradiation region LA may be configured to be variable.

A distance at which the instrument height measuring unit 40 is used is an installation height of the surveying instrument 1, that is, substantially the height of a line of sight of a worker. An irradiation region of diffusion light expands infinitely according to the distance, however, the purpose of use of the instrument height measuring unit 40 is limited, the use distance is short, and in addition, the use range is narrow, so that the size of the irradiation region LA in which a distance-measuring object is irradiated with the distance-measuring light L can also be set to be within a predetermined range.

In the present embodiment, light to be emitted by the light transmitting unit 51 is visible light, and distance-measuring light L irradiated toward a position below the surveying instrument 1 is also used as centering laser light. That is, the optical axis of the collimating lens 52 matches the centerline V of the vertical shaft 28, and the distance-measuring light L is emitted from the bottom surface of the surveying instrument 1 toward a position below along the vertical axis (center line V) of the surveying instrument main body, so that the distance-measuring light L irradiated toward the distance-measuring object is visually recognized as a spotlight for centering that serves as a guide below the vertical axis of the surveying instrument main body passing through the center point O. In a centering work, by aligning a center of light in the irradiated irradiation region LA with the center of the measuring mark 2, the surveying instrument 1 can be disposed along a vertical axis of the measuring mark 2.

When a worker installs the surveying instrument 1 by using the measuring mark 2 as a reference point, the worker places the surveying instrument 1 substantially vertically above the measuring mark 2 by means of the tripod 8, and performs a leveling work to level the surveying instrument

1 by using the adjust screw of the leveling base 25. Then, distance-measuring light L is emitted from the instrument height measuring unit 40 toward a position below the vertical axis of the surveying instrument main body, and is irradiated as light in the irradiation region LA toward the measuring mark 2, so that while maintaining a leveled state, the worker performs a positional adjustment by sliding the surveying instrument 1 so that the center of the measuring mark 2 matches a center of the distance-measuring light L irradiated toward the measuring mark 2. This centering work may cause the surveying instrument to tilt from the horizontal state, and by repeating the leveling work and the centering work, the worker horizontally places the surveying instrument 1 vertically above the measuring mark 2. After the centering work is completed, a distance measurement is performed by the instrument height measuring unit 40, a distance to the measuring mark 2 is calculated, and an instrument height T is acquired.

Both of the leveling work and the centering work can be performed by a worker in a posture facing the surveying instrument 1, and calculation of the instrument height T is also automatically performed, so that the burden of centering work and the burden of installation of the surveying instrument 1 on the worker are reduced.

Visible laser light for centering is preferably green laser light that is high in visibility. The workability of the centering work to align irradiation light with the reference point is improved. Without limitation to the green laser light, red laser light or laser light in other colors can be used without problem.

As a distance-measuring method, a pulse method is preferably employed. In a phase difference method, there is a possibility that the irradiation region may be limited in size, so that the pulse method that does not rely on the size of the irradiation region is preferably used.

In the present embodiment, the instrument height measuring unit 40 has not only the instrument height measuring function but also a centering laser light irradiating function for the centering work. Without limitation to this, the instrument height measuring unit 40 may have only the instrument height measuring function, other unit may be configured so as to perform the centering work separately. For the centering work, a conventional configuration, for example, a configuration including a centering telescope, can be used without problem.

In the present embodiment, the instrument height measuring unit 40 is disposed above the vertical shaft 28, and its optical members of the instrument height measuring unit are also all disposed above the vertical shaft 28. Without limitation to this, some of the optical members of the instrument height measuring unit 40 may be disposed on the vertical shaft 28, the fixation portion 24, and the like, such as a configuration in which the light transmitting unit 51 is attached to the main body casing 12, and the collimating lens 52 and the objective lens 57 are disposed inside the hollow vertical shaft 28. The defocusing lens 56 is disposed in front of the beam splitter 53, however, the defocusing lens 56 only has to be disposed on an outward path of the distance-measuring light path, and may be disposed behind the beam splitter 53.

In the present embodiment, a beam whose irradiation shape is a point is expanded in irradiation shape into a substantially circular shape by using a plain lens, however, the shape of the irradiation region LA is not limited to a circular shape, and may be a randomly diffused shape, and may be set to a desired shape by using a lens.

(Modification)

For the instrument height measuring unit, a distance image sensor that acquires distance image information of a predetermined range may be used. The distance image sensor acquires an image of a distance-measuring object, and acquires a depth, that is, a distance as the information. For arithmetic operation of a distance, a publicly known method may be used such as a light time-of-flight method in which a distance is obtained from a time until light projected on an object returns by being reflected, and a pattern projection method in which a distance is obtained from the degree of distortion of a reflection image of a predetermined pattern of light projected on a distance-measuring object. The arithmetic unit 90 acquires an instrument height T by calculating an average value of distances in a predetermined region centered on an optical axis of an imaging range.

Figure 6:
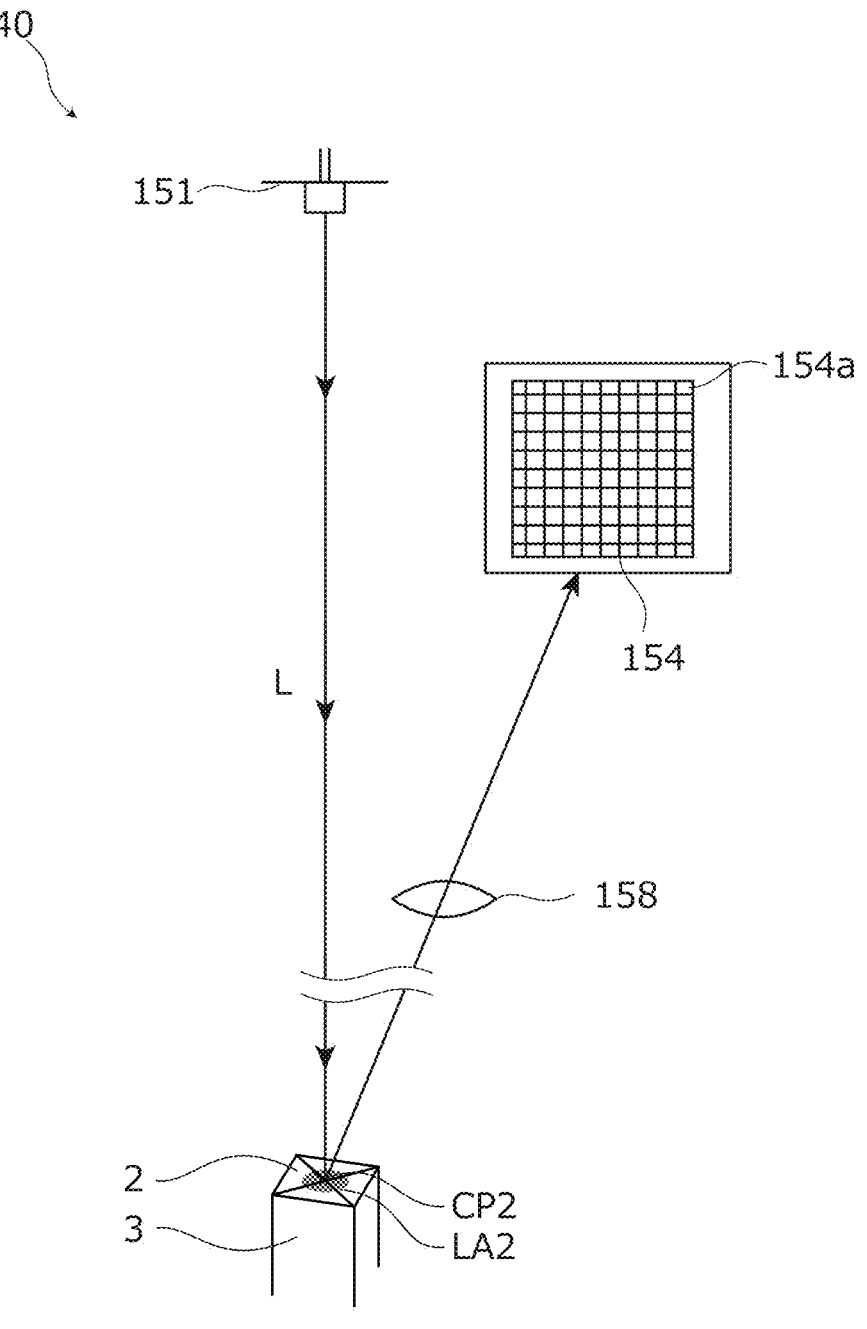
FIG. 6 illustrates a modification.

FIG. 6 illustrates an optical configuration of an instrument height measuring unit 140 as an example using a distance image sensor as a modification.

In the instrument height measuring unit 140, alight transmitting unit 151 emits infrared light and transmits it toward a distance-measuring object (measuring mark 2). The instrument height measuring unit 140 includes a plurality of imaging elements 154a disposed in a matrix as a light receiving unit 154. Distance-measuring light L emitted from the light transmitting unit 151 is reflected by the measuring mark 2, passes through an image forming lens 158, and is received by the light receiving unit 154. The arithmetic unit 90 calculates a distance-measurement result for each of the imaging elements 154a from light reception signals of the respective imaging elements 154a received by the light receiving unit 154. Accordingly, together with an image projected by the distance-measuring light L, depths (distances) to constituent points of the image are also acquired. A reference point CP2 of the measuring mark 2 is also acquired as an image. The arithmetic unit 90 calculates an instrument height T as a distance to the measuring mark 2 by averaging distances at pixels in a predetermined region LA2 centered on a point on the optical axis. For acquiring an average value of measurement results, a worker may designate the reference point CP2 and the predetermined region LA2 from the acquired image. As long as within a measurement range for measuring an instrument height T, a sufficiently accurate measurement can be made even with a distance image sensor, and the distance image sensor can be implemented at a comparatively low cost.

Preferred embodiments of the present invention have been described above, and the embodiments described above are just examples of the present invention, and can be combined based on the knowledge of a person skilled in the art, and such a combined embodiment is also included in the scope of the present invention.

REFERENCE SIGNS LIST

1: Surveying instrument
2: Measuring mark
28: Vertical shaft
40: Instrument height measuring unit
51: Light transmitting unit
54: Light receiving unit
56: Defocusing lens
80: Tilt sensor
90: Arithmetic unit
140: Instrument height measuring unit
151: Light transmitting unit
154: Light receiving unit
154a: Imaging element L: Distance-measuring light
LA: Irradiation region
T: Instrument height

The invention claimed is:

1. A surveying instrument including an instrument height measuring unit configured to make a distance measurement by emitting distance-measuring light to a distance-measuring object below a vertical axis of a surveying instrument main body, and an arithmetic unit configured to calculate a distance to the distance-measuring object by analyzing light being the distance-measuring light that has returned by being reflected by the distance-measuring object, and calculate an instrument height, wherein the instrument height measuring unit is configured to make a distance measurement by irradiating the distance-measuring light toward a predetermined region of the distance-measuring object centered on a point below the vertical axis of the surveying instrument main body, and the arithmetic unit is configured to calculate the instrument height by operating an average value of distance-measurement values in the region, and wherein an irradiation region of the distance-measuring light at a distance of 1 m from a bottom surface of the surveying instrument main body has a maximum outer diameter of 5 mm to 30 mm.

2. The surveying instrument according to claim 1, wherein the instrument height measuring unit comprises:

a light transmitting unit configured to emit the distance-measuring light toward the distance-measuring object;

a light receiving unit configured to receive the distance-measuring light that has been emitted from the light transmitting unit and returned by being reflected by the distance-measuring object; and a defocusing lens disposed in a light path of the distance-measuring light and configured to diffuse incident light, the distance-measuring light that has passed through the defocusing lens is emitted toward a position below the vertical axis of the surveying instrument main body to irradiate the region of the distance-measuring object centered on the point below the vertical axis of the surveying instrument main body, and the arithmetic unit is configured to calculate the instrument height by taking an average distance to the region irradiated with the distance-measuring light as a distance to the distance-measuring object by calculating a distance to the distance-measuring object based on a light reception signal of the light receiving unit and further calculating an average value of the distance to the distance-measuring object.

3. The surveying instrument according to claim 2, wherein the defocusing lens is a plain lens.

4. The surveying instrument according to claim 1, wherein the distance-measuring light is visible laser light, and the distance-measuring light is irradiated as a spotlight for centering toward a position below the vertical axis of the surveying instrument main body.

5. The surveying instrument according to claim 2, wherein the distance-measuring light is visible laser light, and the distance-measuring light is irradiated as a spotlight for centering toward a position below the vertical axis of the surveying instrument main body.

6. The surveying instrument according to claim 3, wherein the distance-measuring light is visible laser light, and the distance-measuring light is irradiated as a spotlight for centering toward a position below the vertical axis of the surveying instrument main body.

7. The surveying instrument according to claim 4, wherein the visible laser light is green laser light.

8. The surveying instrument according to claim 1, wherein the instrument height measuring unit is a distance-measuring device employing a pulse method.

9. The surveying instrument according to claim 1, wherein the arithmetic unit operates an average value of measurement values in the region irradiated with the distance-measuring light, and further makes a correction with a tilt measured by an incorporated tilt sensor.

10. The surveying instrument according to claim 1, wherein the instrument height measuring unit is a distance image sensor configured to acquire distance image information of a predetermined range, the distance-measuring light is infrared light, the distance image sensor includes a plurality of imaging elements for acquiring the distance image information, and the arithmetic unit is configured to calculate a distance for each of the imaging elements from signals received by the imaging elements, and calculate an average value of the distances of the imaging elements in a predetermined range, and take the average value as a distance to the distance-measuring object.

\* \* \* \* \*